United States Patent Office 3,266,016
Patented August 9, 1966

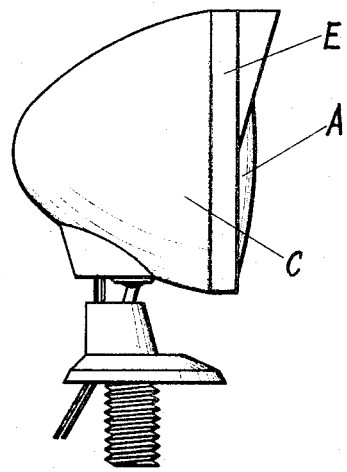
Fig. 1
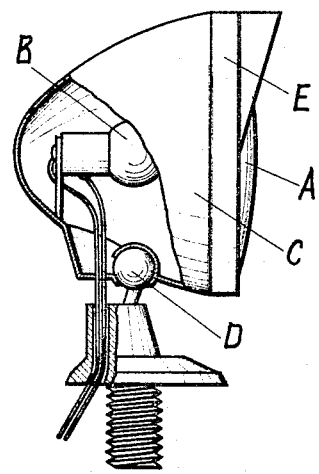
Fig. 2
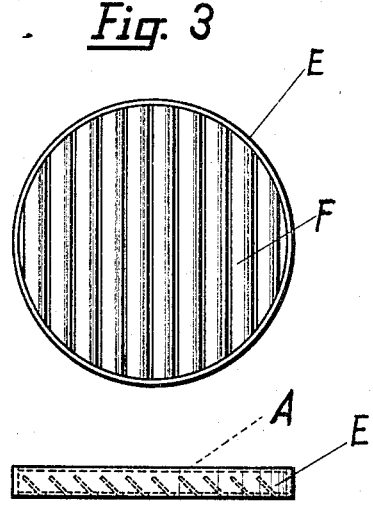
Fig. 3
Fig. 3a
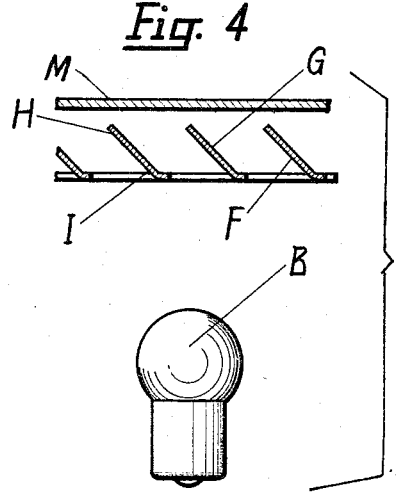
Fig. 4
INVENTORS.
MAMORU MARUYAMA
SHIGERU MARUYAMA
BY
Kane, Dalsimer + Kane
ATTORNEYS.

3,266,016
OUTSIDE SIGNAL FOR AUTOMOBILES
Mamoru Maruyama, % Maru-sho, Taisei Bldg., 78 6-chome, and Shigeru Maruyama, Sumiyoshi-cho, 426 Rokkakubashi-machi, both of Yokohama, Japan
Filed Aug. 6, 1964, Ser. No. 387,887
1 Claim. (Cl. 340—98)

This invention relates to a new innovation in vehicle rear-view mirrors.

It is a principal object of this invention to combine the functions of a fender rear-view mirror and flashing turn-indicator. Thus, in place of the ordinary reflecting rear-view mirrors, a semi-opaque one-way glass mirror is used with a source of light installed behind the glass. Under normal conditions, this would function as an ordinary rear-view mirror. However, when the inner lamp flashes, the special one-way glass mirror lights up and glows in unison with the vehicle's other turning signals. When lights flash, the whole mirror surface lights up giving warning to other vehicles, etc., thus combining effectively the functions of the ordinary rear-view mirror and the turn indicators.

Due to the nature of semi-opaque mirrors, only a fraction of the inner light reaches the exterior. A relatively strong source of light is preferred for effective functioning in the daytime or when the sun's rays are especially bright as during clear, fair weather. Installation of overly-strong lamps, however, would rule out the possibility of utilizing the vehicle's originally-installed flasher relay. On the other hand, increasing the transparency of the glass would decrease its effectiveness as a rear-view mirror.

In order to overcome these shortcomings to the application of semi-opaque mirrors in flashing turn-indicators and thus insuring sufficient glowing capacity for daylight use, the following have been adopted by this invention:

(1) Light from the exterior is substantially completely shut out by back surface of the mirror while transparency ratio is increased;

(2) Installation of a reflector behind inner light source concentrates light rays on back surface of mirror, thus increasing the glowing capacity of the mirror.

In this way, this invention combines the functions of the rear-view mirror and flashing turn-indicator in such a way that is immediately visible to vehicles in the rear or alongside where such visibility is most urgently required. Not only has this inventon increased such visibility but it has done so with maximum simplicity, thus decreasing cost accordingly.

When functioning as a turn-indicator, light emitted by this invention covers the whole surface of the mirror warning other vehicles to the rear and alongside as to the driver's intentions. Excessively bright rays, however, may be cast toward driver due to the angle of the mirror while also blurring out rear image while lights flash on. Either way, this may cause great inconvenience to the driver.

A further characteristic of this invention resides in methods by which such shortcomings are nullified. In other words, cutting off of the rays which would normally cause glare in driver's eye when the lights are flashing; and maintaining mirror's original function of giving the driver a view of his rear while simultaneously diverting the rays toward the exterior of the vehicle where it is most required.

While this invention is used together with vehicle's original turn-indicators, turning signals become immediately visible to vehicles and pedestrians running or walking parallel to vehicle. Thus, they are effectively cautioned. Hitherto used standard turn-indicators on front and rear end of the vehicles would be useless due to such viewing angles. In most instances, clear warning will also be given when the driver wishes to change lanes on the highway. Further, even when light is flashing, rear-view mirror functions quite normally for viewing purposes by the driver.

In the drawings:

FIG. 1 is a side elevational view showing the complete exterior of the mirror turn-indicator unit with the curvature of the mirror being exaggerated for illustrative purposes of the invention;

FIG. 2 shows a cut-away side veiw of this unit;

FIG. 3 is a plan view showing mirror with attached baffle;

FIG. 3a is an end elevation thereof; and

FIG. 4 is a fragmentary enlarged view of the mirror and baffle along with the indicator lamp.

In the figures, A is a semi-opaque mirror having a mirror surface M; B is the turn-indicator lamp; C is the compartment in which it is enclosed; D is the lamp connector; and E the mirror shade. When wires leading from lamp are connected to turn-indicator wires in vehicle, the difference in light values inside and outside the compartment makes the lamp visible day or night. Thus, the unit is adapted to perform a turn-indicator function while also serving as a rear view mirror when the lamp is not lit. Thus, a dual purpose is effectively served. The addition of color to signal lamp through special known processing will enhance its eye-catching value; and the flashing signal (blinking on and off) when the turn signal is in use through the above mentioned wiring or equipment also increases the effectiveness thereof. It should be understood that such modifications are included in the scope of this invention.

FIGURES 3 and 4 indicate the use of rigid baffle type shades F to guide light rays away from the driver when lights are flashing. The number of divisions in baffle is optional; but they are, preferably, positioned very close to mirror surface. The lamp side of baffle F is the reflecting surface; the opposite side G of baffle faces mirror A is a non-reflecting surface. Light from the interior will be concentrated in the desired direction most effectively while diverting and reflecting rays away from driver. The rear-view mirror is able to function as a rear-image catcher even while light is flashing.

Baffle material may embody metal, plastic, paper and other suitable material having optical reflective properties or capable of being treated for such purposes. Number of baffle blades is optional; the number of blades being governed by amount of space available. (Increased number of blades makes possible a decrease in width thereof; as their relative angle remains constant, this means less space will be required.) A baffle blade angle of 45° is considered more or less standard but angle limitations are governed by the angle formed by H and I in the above figures (H denotes end of blade; I the base of same). The blades are positoned as close to the mirror surface as possible to prevent unwanted random reflections.

Thus, the several aforenoted objects and advantages are most effectively attained. Although several somewhat preferred embodiments of this invention have been disclosed and described in detail herein, it should be understood that this invention is in no sense limited thereby and its scope is to be determined by that of the appended claim.

We claim:

A rear-view mirror combining the functions of a turn-indicator on automotive vehicles through use of a semi-opaque one-way mirror comprising: a housing having an opening; a semi-opaque one-way mirror having a mirror surface extending across said opening; mounting means for mounting an indicator lamp within said housing whereby direct and reflected rays are concentrated from the enclosed lamp on the mirror surface causing the mirror surface to glow and thus serve as a clearly visible turn-indicator while also functioning as a rear-view mirror when the lamp is not flashing; a baffle means being disposed within said housing intermediate said mirror and mounting means for both directing and diverting light in a given direction when the lamp is flashing, the baffle means including a number of baffle blades set in a predetermined angle relative to the mirror, the surface of the blades facing the mirror being non-reflective and the surface of the blades facing the mounting means being reflective whereby light from the lamp is adapted to be directed away from the automobile driver and the rear-view mirror is adapted to function as a rear-image catcher when the lamp is flashing.

References Cited by the Examiner

UNITED STATES PATENTS

| | | | |
|---|---|---|---|
| 1,670,012 | 5/1928 | Talley | 340—382 |
| 2,511,971 | 6/1950 | Dalton | 340—98 |
| 2,580,014 | 12/1951 | Gazda | 340—98 X |
| 2,616,957 | 11/1952 | Thiem | 340—382 |

NEIL C. READ, *Primary Examiner.*

I. J. LEVIN, *Assistant Examiner.*